United States Patent

Moses

[15] 3,670,148

[45] June 13, 1972

[54] SELECTIVE SIGNAL TRANSMISSION SYSTEM

[72] Inventor: Adrian J. Moses, Newhall, Calif.

[73] Assignee: Lear Siegler, Inc., Santa Monica, Calif.

[22] Filed: Sept. 14, 1970

[21] Appl. No.: 71,751

[52] U.S. Cl. ....................235/150.2, 244/77 R, 307/204, 318/564, 328/154, 340/146.1

[51] Int. Cl. ....................G06f 15/50, G06f 11/00

[58] Field of Search....................235/150.2; 340/146.1; 244/77 R, 77 SE; 318/564, 565; 307/204, 219, 303; 328/116, 154, 163

[56] References Cited

UNITED STATES PATENTS

| | | | |
|---|---|---|---|
| 3,457,479 | 7/1969 | Varner | 318/564 X |
| 3,469,162 | 9/1969 | Goslin | 318/564 X |
| 3,489,889 | 1/1970 | Escobosa | 318/564 X |
| 3,492,588 | 1/1970 | Woodward, Jr. | 307/204 X |
| 3,544,778 | 12/1970 | Masters, Jr. | 340/146.1 X |
| 3,551,776 | 12/1970 | Tawfik et al. | 318/564 |
| 3,555,290 | 1/1971 | Ellermeyer | 307/204 X |
| 3,573,587 | 4/1971 | Bishop et al. | 318/564 |

*Primary Examiner*—Charles E. Atkinson
*Attorney*—Harold L. Jackson, Stanley R. Jones, Robert M. Vargo and Eric T. S. Chung

[57] ABSTRACT

A plurality of high-gain amplifiers equal in number to the number of inputs of a signal voter that selectively transmits the signal applied to one of its inputs, depending upon the relative input signal amplitudes is disclosed. The outputs of the amplifiers are connected to drive the respective inputs of the voter and the output of the voter is fed back to the inputs of the amplifiers in a sense to cause the output of the voter to track an external signal applied to the amplifier driving the transmitting input of the voter. Preferably, the amplifiers are of the differential type, the output of the voter being connected to the inverting input and redundant autopilot computers being coupled to the respective non-inverting inputs, and the output of the voter is coupled by an isolating operational amplifier to aircraft control surface actuators.

13 Claims, 3 Drawing Figures

INVENTOR.
ADRIAN J. MOSES
BY
Christie, Parker & Hale
ATTORNEYS

SELECTIVE SIGNAL TRANSMISSION SYSTEM

BACKGROUND OF THE INVENTION

This invention relates to the selective transmission of analog signals and, more particularly, to an improved signal voter for selecting one of a number of command signals to be used with a control element, such as an aircraft control surface.

A signal voter is an electronic device that has a plurality of inputs and a single output. The voter transmits to its output the signal applied to one of its inputs, depending upon the relative amplitudes of such input signals. For example, a voter having three inputs, which is sometimes called a trivoter, transmits to its output the input signal whose amplitude lies between the amplitudes of the remaining two input signals. A signal voter having four inputs, which is sometimes called a quadvoter, transmits to its output the input signal whose amplitude is the secondmost positive of the four input signals or the secondmost negative of the four input signals.

A typical signal voter comprises a network of diode or transistor switches that interconnect the different voter inputs to the common voter output. The network provides several stages of comparison among various combinations of the signals applied to the voter inputs. Pursuant to each comparison, either the most positive or the most negative of the compared signals is transmitted, while transmission of the remaining signal or signals is blocked. In this manner, only the signal applied to one of the inputs of the voter is transmitted to the voter output, depending upon the relative amplitudes of the voter input signals and the logical truth table defined by the configuration of the switch network. Ideally, the signal at the voter output is a true representation in amplitude of the signal applied to the transmitting input of the voter. Unfortunately, in practice a true representation is lacking because the voltage-current characteristics of the switches are not uniform and are nonlinear.

A copending patent application of Bruce R. Cereghino and Paul M. Rostek, Ser. No. 26,890, filed Apr. 9, 1970 and assigned to the assignee of the present application, discloses in connection with an invention for testing a signal voter a particular signal voter arrangement that permits truly representative selective signal transmission with a diode network. Each diode of the network cooperates with a high-gain amplifier stage to form a circuit element; specifically, the diode is connected between the output and the input of the amplifier stage as a feedback path, the input of the amplifier stage serves as the input terminal of the circuit element, and the output of the amplifier stage serves as the output terminal of the circuit element. Accordingly, when a diode is selectively transmitting, such diode and its amplifier stage function as an operational amplifier that causes the signal at the output of the circuit element to track the signal at the input of the circuit element, irrespective of the lack of uniformity and nonlinearity of the diode characteristics. Since at least one amplifier stage is required for each diode, this configuration increases substantially the complexity of a signal voter.

One common application for signal voters is a fail-operational redundant control system, such as an automatic flight control system for an aircraft. In a typical fail-operational redundant automatic flight control system, a large number of signal voters may be found. Therefore, unnecessary complexity in one signal voter is multiplied manyfold in a complete system.

SUMMARY OF THE INVENTION

According to the invention, the output of a high-gain amplifier is connected to drive each input of a signal voter and the output of the signal voter is fed back to the input of each of the amplifiers in a sense to cause the signal at the output of the voter to track in amplitude the external signal applied to the amplifier driving the transmitting input of the voter. This arrangement results in a sizable reduction in the complexity of a signal voter because the number of amplifiers is dependent upon the number of inputs that the voter has rather than the number of diodes the voter has. Preferably, the high-gain amplifiers are of the differential type, each having an inverting input terminal and a non-inverting input terminal. The output of the voter is connected to all the inverting input terminals and the signals to be selectively transmitted are coupled to the respective non-inverting input terminals.

A feature of the invention is the use of a diode network particularly well suited for implementation with a monolithic diode array. Specifically, with a quadvoter, the network comprises three groups of diodes. Each group has three diodes having the same electrode connected to a common point. Accordingly, a monolithic diode array having only twelve terminals can serve as the selective transmitting network in connection with four high gain integrated circuit amplifiers.

BRIEF DESCRIPTION OF THE DRAWING

The features of a specific embodiment of the best mode contemplated of carrying out the invention are illustrated in the drawing, in which.

DETAILED DESCRIPTION OF THE SPECIFIC EMBODIMENT

Figures 1, 2A, 2B:
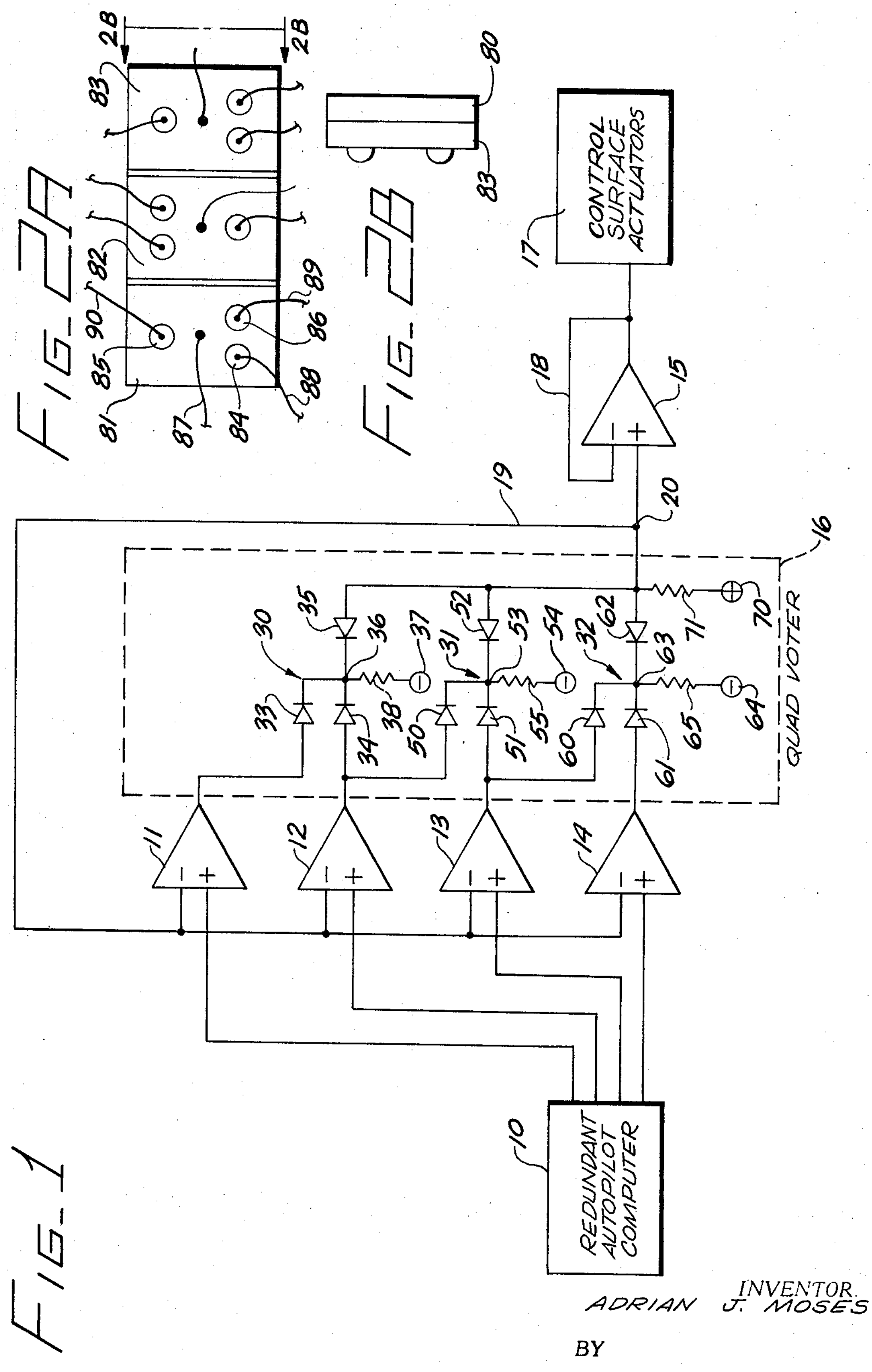
FIG. 1 is a schematic diagram partially in block form of a control system incorporating the principles of the invention.
FIGS. 2A and 2B are front and side elevation views, respectively, of a monolithic diode array suitable for use as a component in the system of FIG. 1.

In FIG. 1, a redundant autopilot computer 10 has four outputs. At each output, an individual command signal is generated responsive to sensors of aircraft conditions. These command signals are nominally identical because they are generated from the same sensor information but are subject to variations in amplitude relative to each other because they are generated by separate redundant computer circuits.

High-gain differential amplifiers 11, 12, 13, 14, and 15 each have an inverting input designated with a minus sign, a non-inverting input designated with a plus sign, and an output. The inverting and non-inverting inputs of a differential amplifier are determined by the stage of the differential amplifier from which the output is taken. A signal applied to the inverting input of one of the differential amplifiers appears at its output inverted in polarity and a signal applied to the non-inverting input of one of the differential amplifiers appears at its output non-inverted in polarity. The outputs of computer 10 are connected to the respective non-inverting inputs of amplifiers 11, 12, 13, and 14.

A quadvoter 16 having four inputs is interposed between the outputs of amplifiers 11, 12, 13, and 14 and the non-inverting input of amplifier 15. A direct feedback connection 19 couples the output 20 of quadvoter 16 to the inverting input of each of amplifiers 11, 12, 13, and 14. The output of amplifier 15 is connected to control surface actuators 17 of the aircraft. A direct feedback connection 18 couples the output of amplifier 15 to its inverting input to form an operational amplifier that isolates actuators 17 from quadvoter 16.

In operation, quadvoter 16 selectively transmits the command signals generated by computer 10 to actuators 17, while transmission of the remaining three command signals is blocked by quadvoter 16. Actuators 17 control the aircraft responsive to the transmitted command signals.

Quadvoter 16 comprises diode groups 30, 31, and 32. Group 30 comprises diodes 33, 34, and 35, the cathodes of which are all connected to a common node 36. A source 37 of negative potential is connected by a resistor 38 to node 36. The anode of diode 33 is connected to the output of amplifier 11, the anode of diode 34 is connected to the output of amplifier 12, and the anode of diode 35 is connected to output 20 of quadvoter 16. Group 31 comprises diodes 50, 51, and 52, the cathodes of which are all connected to a common node 53. A source 54 of negative potential is connected by a resistor 55 to node 53. The anode of diode 50 is connected to the output of amplifier 12, the anode of diode 51 is connected to the output of amplifier 13, and the anode of diode 52 is connected to output 20 of quadvoter 16. Group 32 comprises diodes 60, 61, and 62, the cathodes of which are all connected to a common node 63. A source 64 of negative potential is connected by a resistor 65 to node 63. The anode of diode 60 is connected to the output of amplifier 13, the anode of diode 61 is connected to the output of amplifier 14, and the anode of diode 62 is connected to the output 20 of quadvoter 16. A source 70 of positive potential is connected by a resistor 71 to output 20 of quadvoter 16.

Pursuant to the truth table disclosed in the above referenced copending application, the signal at the output of one of amplifiers 11, 12, 13 and 14, depending upon the relative amplitudes of such signals, is selectively transmitted by the corresponding input of quadvoter 16 to output 20 of quadvoter 16. Diodes 33 and 34 select the more positive of the signals at the outputs of amplifiers 11 and 12. Diodes 50 and 51 select the more positive of the signals appearing at the outputs of amplifiers 12 and 13, and diodes 60 and 61 select the more positive of the signals appearing at the outputs of amplifiers 13 and 14. Similarly, diodes 35, 52, and 62 select the most negative of the signals appearing at nodes 36, 53, and 63. As a result, only one forward-biased, low impedance diode path is formed through quadvoter 16, the remaining diode paths all being back-biased, i.e., high impedance. The forward-biased diode path and connection 19 complete a feedback loop around the corresponding amplifier (11, 12, 13, or 14), i.e., the amplifier whose output is connected to the forward-biased diode path. Thus, the signal appearing at the output of quadvoter 16 is applied to the corresponding amplifier in a sense to reduce the discrepancy between the amplitude of the signal at the output of quadvoter 16 and the amplitude of the signal applied to the input of the corresponding amplifier. In other words, the forward-biased diode path through quadvoter 16, the amplifier (11, 12, 13, or 14) whose output is connected to the forward-biased diode path, and connection 19 function as an operational amplifier to cause the output of quadvoter 16 to track in amplitude the external command, signal applied to the amplifier that drives the transmitting input of quadvoter 16. Consequently, the lack of uniformity and nonlinearity of the voltage-current characteristics of the diodes comprising quadvoter 16 do not affect the amplitude of the selectively transmitted command signal.

The arrangement of the diodes of quadvoter 16 into three groups such that the same electrode of each diode is connected to a common point makes the quadvoter particularly susceptible of implementation with a monolithic diode array. In FIGS. 2A and 2B, a suitable monolithic diode array is depicted. A layer of N-conductivity type semiconductive material is deposited on an insulative substrate 80. The N-type material forms three separate, i.e., electrically isolated, areas 81, 82, and 83. Three small buttons of P-conductivity type semiconductive material, such as those designated 84, 85, and 86 on area 81, are attached, i.e., fused, to each area of N-type material to form a unilateral conducting, i.e., a PN junction, at the interface between the two types of semiconductive material. One lead, such as that designated 87, is attached to each area of N-type material and leads, such as those designated 88, 89, and 90, are attached to the respective buttons of P-type material on each area. By way of example by reference to FIG. 1, lead 87 could be connected to resistor 38, lead 88 could be connected to the output of amplifier 11, lead 89 could be connected to the output of amplifier 12, and lead 90 could be connected to output 20 of quadvoter 16. Similarly, the leads corresponding to the other areas could be connected to the remaining components of quadvoter 16 in the manner depicted in FIG. 1.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the invention is applicable to other configurations of quadvoters, to trivoters, and to higher order signal voters.

What is claimed is:

1. A selective signal transmission system comprising:

a signal voter having a plurality of inputs and a single output, the voter transmitting to its output the signal applied to one of its inputs depending upon the relative amplitudes of such input signals;

a plurality of high-gain amplifiers equal in number to the inputs of the signal voter, each amplifier having an input and an output;

means for connecting the output of each amplifier to a different input of the signal voter to drive such voter input;

a source of a plurality of nominally identical input signals equal in number to the plurality of inputs of the signal voter, each input signal being applied to the input of a different amplifier;

utilizing means coupled to the output of the signal voter; and feedback means connecting the output of the signal voter to the input of each amplifier in a sense to cause the output of the signal voter to track the input signal applied to the amplifier driving the transmitting input of the signal voter.

2. The transmission system of claim 1, in which the amplifiers are differential amplifiers each having an inverting input terminal and a non-inverting input terminal, the feedback means connecting the output of the signal voter to the inverting input terminals of the amplifiers.

3. The signal transmission system of claim 2 in which the signal voter is a quadvoter having first, second, third and fourth inputs, the quadvoter comprising: a first diode connected between the input and a first common node and poled in a first direction; a second diode connected between a second input and the first common node and poled in the first direction; a third diode connected between the first common node and the output poled in a second direction opposite to the first direction; a fourth diode connected between the second input and a second common node and poled in the first direction; a fifth diode connected between the third input and the second common node and poled in the first direction; a sixth diode connected between the second common node and the output and poled in the second direction; a seventh diode connected between the third input and a third common node and poled in the first direction; an eighth diode connected between the fourth input and the third common node and poled in the first direction; a ninth diode connected between the third common node and the output and poled in the second direction; and means for biasing the diodes in a polarity to transmit selectively the signal applied to one of the inputs depending upon the relative amplitudes of such input signals.

4. The transmission system of claim 3, in which the first direction of diode poling is such that the first, second, fourth, fifth, seventh and eighth diodes are forward-biased when the corresponding input is at a positive potential relative to the corresponding common node, and the biasing means comprises negative sources of potential connected to the first, second, and third nodes and a positive source of potential connected to the output of the quadvoter.

5. The signal transmission system of claim 3, in which the utilizing means is an aircraft control surface actuator and the source is an autopilot computer that generates four individual nominally identical command signals for driving the actuator responsive to aircraft sensor information, the command signals being applied to the non-inverting input terminals of the respective amplifiers.

6. The signal transmission system of claim 5, in which the output of the quadvoter is coupled to the utilizing means by an operational amplifier.

7. An automatic control system comprising:

means for generating a plurality of at least three individual command signals that are nominally identical but subject to variations in amplitude with respect to each other;

a plurality of high-gain amplifiers equal in number to the command signals, each amplifier having an input and output;

first means for coupling the command signals to the inputs of the respective amplifiers;

an element to be controlled;

means responsive to a driving signal for actuating the element to be controlled;

a diode configuration interconnecting the outputs of the amplifiers to the actuating means to selectively transmit to the actuating means as the driving signal the signal at the output of one of the amplifiers depending upon the relative amplitudes of the amplifier output signals, the diodes in the path of the configuration transmitting the amplifier output signal all being forward-biased and at least one of the diodes in each of the remaining paths being back-biased; and second means for coupling the signal transmitted by the diode configuration back to the input of each amplifier in a sense to reduce its discrepancy from the command signal coupled to the input of such amplifier.

8. The control system of claim 7, in which the amplifiers are differential amplifiers having an inverting input and a non-inverting input, the second coupling means couples the signal transmitted by the diode configuration to one input of each of the amplifiers, and the first coupling means couples the command signals to the other input of the respective amplifiers.

9. The control system of claim 8, in which the command signals are coupled to the non-inverting input of the respective differential amplifiers and the signal transmitted by the diode configuration is coupled to the inverting input of the differential amplifiers.

10. The control system of claim 9, in which the element to be controlled is an aircraft control surface, and the command signal generating means comprises an autopilot computer responsive to sensors of the aircraft conditions.

11. A quadvoter comprising:

an insulative substrate;

first, second, and third mutually isolated layers of a first conductivity type semiconductive material mounted on the substrate;

first, second, and third buttons of a second conductivity type semiconductive material attached to each of the layers, the second conductivity type being opposite the first conductivity type, a unilaterally conducting junction being formed at the interface of each button and the layer to which it is attached;

first, second, third, and fourth quadvoter input terminals to which signals to be selectively transmitted are applied;

a quadvoter output terminal at which the selectively transmitted signal is to appear;

means for connecting the first input terminal to the first button of the first layer;

means for connecting the second input terminal to the second button of the first layer and the first button of the second layer;

means for connecting the third input terminal to the second button of the second layer and the first button of the third layer;

means for connecting the fourth input terminal to the second button of the third layer;

means for connecting the third button of the first, second, and third layers to the output terminal;

means for biasing the junctions to provide a transmission path between only one of the input terminals and the output terminal;

first, second, third, and fourth high-gain differential amplifiers, each having an inverting input, a non-inverting input, and an output;

means for connecting the outputs of the high-gain amplifiers to the respective quadvoter inputs;

means for connecting the quadvoter output to one of the inputs of each of the differential amplifiers;

a source of four nominally identical signals to be selected, each signal being applied to the other input of a different one of the differential amplifiers; and utilizing means coupled to the quadvoter output terminal.

12. The quadvoter of claim 11, in which the first conductivity type is N-type, the second conductivity type is P-type, and the biasing means comprises sources of negative potential connected respectively to the first, second, and third layers and a source of positive potential connected to the output terminal.

13. The quadvoter of claim 11, in which the source of signals comprises an autopilot computer responsive to sensors of aircraft conditions and the utilizing means comprises an aircraft control surface positioned responsive to the signal selectively transmitted by the quadvoter.

* * * * *